March 31, 1964     J. HAINZELIN ETAL     3,127,320
CELL FOR VERTICAL CHANNEL NUCLEAR REACTOR
Filed April 28, 1959     2 Sheets-Sheet 1
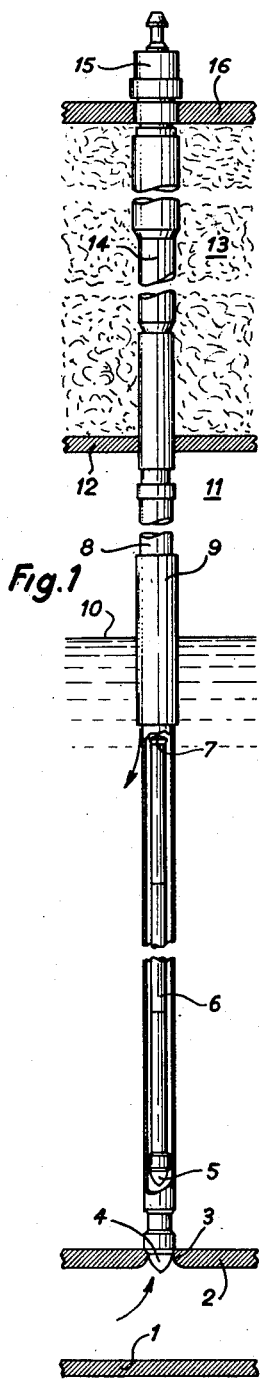
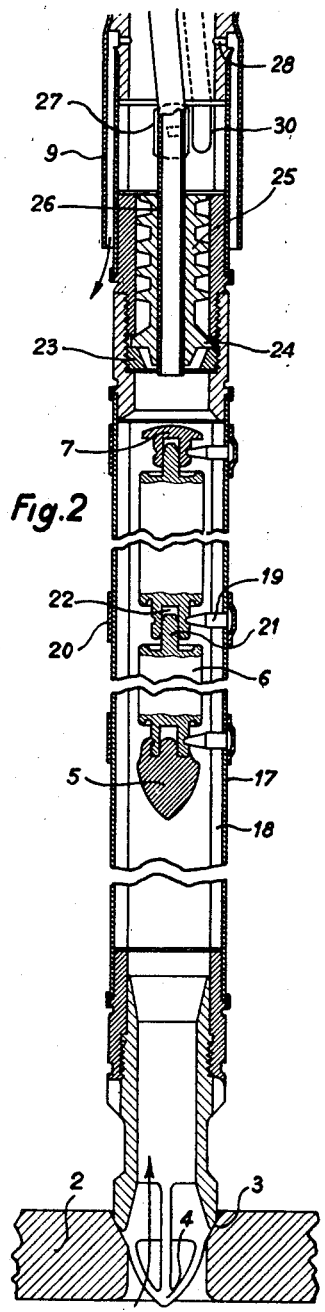
INVENTORS
Jean Hainzelin
Léon LeFlem
Jacques Robert
BY Bacon & Thomas
ATTORNEYS

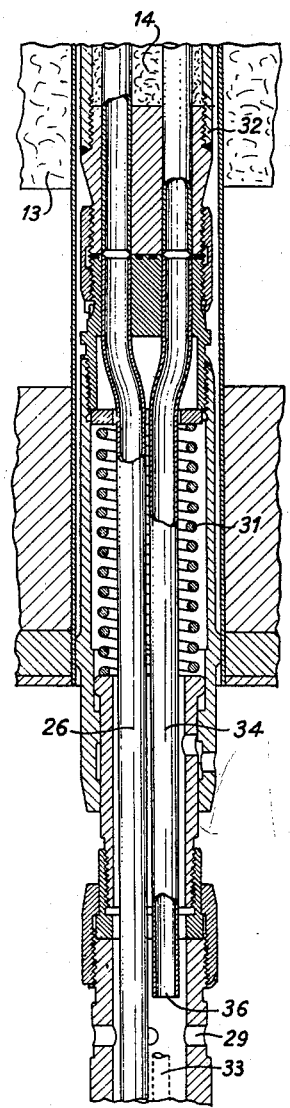
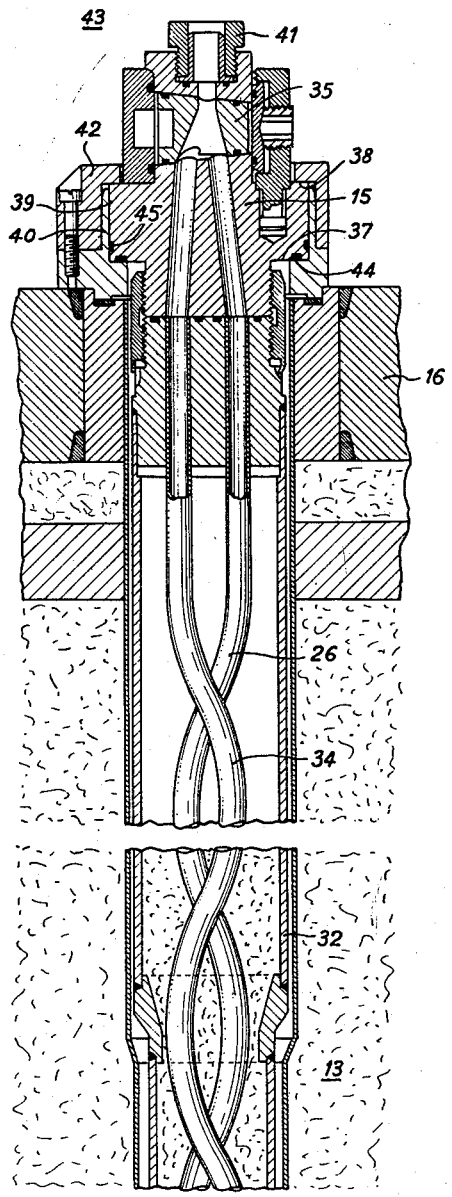

United States Patent Office 3,127,320
Patented Mar. 31, 1964

3,127,320
CELL FOR VERTICAL CHANNEL
NUCLEAR REACTOR
Jean Hainzelin, Paris, Léon Le Flem, Enghien-les-Bains, and Jacques Robert, Paris, France, assignors to Commissariat a l'Energie Atomique, Paris, France
Filed Apr. 28, 1959, Ser. No. 809,533
Claims priority, application France May 3, 1958
7 Claims. (Cl. 176—19)

It is well known that a nuclear-fission reactor is generally constituted by a working or active section, or core, composed of fissile or combustible material, and a liquid or solid substance for slowing down the neutrons, or moderator, the active section being surrounded by a reflector, followed by biological and thermal protective shields.

The distribution of the fissile substance and the moderator inside the active section may be effected in a variety of ways; the most usual arrangement consists of distributing the fissile or combustible material, which is put in the form of elements or "cartridges," in channels which are parallel to the axis of the reactor, i.e., in horizontal or vertical channels in which a cooling fluid circulates. This cooling fluid, be it liquid or gaseous, washes against the walls of the cartridges of combustible elements and, while the reactor is in operation, they convey to the heat recovery plant the heat given off by nuclear reaction.

In this very standard arrangement, the term "cell" is applied to each of the units which are contained in the channels of the reactor, or which constitute these various channels. These cells fulfill a variety of functions; they enable the combustible elements constituting the active section of the reactor to be introduced and placed in position in the reactor; they act as channels for the cooling fluid; if needs be they provide a means of support and operation for the various individual components which go to make up the control and test equipment with which each channel is equipped.

The present invention has as its object a new type of cell for vertical-channel nuclear reactors, which has been evolved with a view to performing a maximum number of tasks whilst taking up a minimum of space itself, this type of cell being more particularly suited for use in nuclear reactors which are moderated and cooled by a liquid.

Such a cell, enclosed in a tubular metal sheath and intended to be placed vertically inside a nuclear reactor—more particularly of the type which is moderated and cooled by a liquid—is characterized essentially in that it has an upper support which is intended to rest on a fixed member at the top of the reactor, and a bottom member connected to the said support through the intermediary of elastic linkage components and centered by its base in recesses provided in a fixed portion of the base of the reactor.

These components, on the one hand, provide a precise vertical positioning of the cell by virtue of the fact of its being suspended by its top and its being centered by its bottom, and, on the other hand, they prevent the cells from being subjected to stresses which might ultimately give rise to deformation, by virtue of there being provided components giving an elastic linkage between the upper and lower portions such as are intended to absorb any variations in the length of the cell which may be set up while the reactor is in operation. In addition, this arrangement prevents the incidence of any vibrations which might otherwise be set up particularly as a result of the circulation of fluids inside and around the cells if the latter were simply suspended by their tops.

Moreover, the provision is made, according to the invention for arranging the cartridges of combustible elements inside the cell in such a manner as to avoid the creation of stresses which might otherwise give rise to deformation on the part of the cell.

To this end, lugs, which are integral with the cell, grip internally on an end of a cartridge the other end of which has a centering teat sliding in a corresponding recess made in the end of the cartridge immediately adjacent.

This arrangement is such that each cartridge is held in vertical postion inside the cell while only being joined to the cell by one of its ends, this leaving it with the mechanical freedom necessary for preventing the incidence of stresses injurious to the operation of the cell.

A cell which presents the above-stated characteristics is particularly intended for the equipping of a reactor having liquid moderator and liquid coolant, for it will be appreciated that the cell is designed in such a way that it shall not become deformed in any event, since there is no risk of any harmful stresses being set up in it. This cell is therefore capable of being immersed vertically in a liquid without any support other than the fixed portion at the top of the reactor which has already been mentioned and from which the cell is suspended.

What is more, according to the invention, means are provided for ensuring with certainty the cooling and supervision of such a cell.

The cooling is taking care of by the circulation, from bottom to top, of a cooling fluid, the cooling fluid being admitted through openings provided in the lower part of the cell which serves for centering same, and draining off, after having washed against the cartridges of combustible material, through a de-gassing device by way of a restrictor having a reduced orifice. This results in a build-up of pressure upstream of the orifice designed to prevent the cooling fluid from boiling up inside the cell.

The supervisory control of the cell is provided for more particularly by the fact of provision being made for extracting test samples of cooling liquid from directly above the last cartridge of combustible material, thus making it possible to make an immediate check on the cartridge.

Other characteristics of a cell in accordance with the invention will emerge during the course of the description which now follows of one particular mode of execution, reference being made to the accompanying drawings, in which:

FIG. 1 is a diagrammatic overall view in elevation, partially in section, of a cell in accordance with the invention, installed in a heavy-water-moderated reactor, not represented in its entirety.

FIG. 2 is a longitudinal section view, on a larger scale, of the lower portion of this cell.

FIG. 3 is a longitudinal section view, likewise on a larger scale, of the middle portion of the cell.

FIG. 4 is a longitudinal section view showing in detail the upper portion of the cell.

In these figures, only the components necessary for an understanding of the invention have been represented, and corresponding components in these various figures have been given identical reference numbers.

The cell represented in the drawings is designed for installation in a vertical-channel, heavy-water moderated and cooled, nuclear reactor; as can be seen in FIGURE 1, the cold heavy water is introduced, under pressure, in a known manner, between the bottom 1 of the core tank (not represented) and a lower plate member or base plate 2.

In each orifice or opening 3 of this plate 2 is fitted the foot 4 at the base of the lower portion of the corresponding cell. The heavy water penetrates inside the latter and rises to the level of the foot of the cartridge 5, it then washes against the walls of the various cartridges of sheathed fissile material, such as 6.

After having reached the top of the last cartridge, which is surmounted by a cap 7, the heavy water penetrates inside the middle portion 8 of the cell, in which are located various components which will be subsequently described with reference to FIGURE 3. The major part of this water drops down again, externally of the cell through a deflector tube 9, which sends it back into the core tank below the free level 10.

The underside 12 of the tank top, below an intermediate biological protective shield 13 of concrete or the like, overlies a helium atmosphere 11 situated above the free level 10 of the heavy water.

The heavy water, thus heated by its passage around the cartridges 6, is drawn out of the reactor and passed on, in a known manner, to a heat exchanger, before being re-injected, in a cold state, between the base 1 and the base plate 2. It will be seen that the cell, described briefly in the foregoing, constitutes the whole of a reactor channel.

A small portion of the heavy water (about 10%) is drawn off, continuously, in the middle portion 8 of the cell and is re-injected after having been utilised in a piece of apparatus for detecting sheathing ruptures, into the main circulation.

The middle portion 8 of the cell is finally surmounted by an upper cell portion including a plug 14 and a cell top 15 fitted wholly in an intermediate biological protective shield 13 or tubular block. The plug 14 provides the leakproof egress of the sample of heavy water and of the cables for the various measuring instruments and, by virtue of the cell top 15, it provides the support for the entire cell on a metal plate 16 which covers the tubular block 13. Moreover, the plug 14 of the upper cell portion is connected to the lower cell portion by an extendable coupling which includes means for telescopically receiving the lower cell portion and a resilient linkage 31, FIG. 3, designed to compensate for any variations in length of the entire cell between its support means 15—16 and its bottom seating 3—4.

The maximum diameter of the cell is, for example, about 80 mm., its total length is four meters, and its weight is of the order of 50 kgs.; each cell contains four cartridges of uranium of a total weight of about 7 kg. The entire reactor contains about a hundred cells as per the invention, and each cell is able to give off from 150 to 200 thermal units per hour.

If reference be now made to FIGURE 2, it will be seen that the cell foot 4 is resting on the base plate 2 of the tank over a conical section 3 and it allows heavy water for cooling the cartridges to pass in through its center. With a view to preventing any possible adhesion of the cells on the base plate 2, the foot 4 of the cell is first subjected to anodic oxidation. This portion of the cell, like all those situated in the heavy water, is made of nuclear quality aluminium, i.e., aluminium having less than one millionth part of impurities capable of neutron absorption.

The cell tube or casing 17, likewise made of very pure aluminium, has six longitudinal inner ribs, such as 18, two or three millimeters wide. These ribs prevent the cartridges of uranium 6, which are liable to become deformed while the reactor is in operation, from bearing on the cell tube 17 over a large area, which, by suppressing the cooling action locally, might otherwise cause a break in the sheathing.

Each cartridge of combustible material 6 is held in place by three tenons or lugs, such as 19, spaced 120° apart (and of which only one is visible in FIGURE 2) traversing the cell tube 17 and themselves fixed by a collar 20 fitting around this tube. The relative arrangement of these components is such that the bottoms of the cartridges 6 are mounted on the lugs 19 and the cartridges themselves are able to expand freely in an upwards direction; apart from this, the cartridges remain centered in the tube because of the presence, at the top end of each of them, of a teat 21 which is able to slide in a corresponding recess 22 machined at the base of the cartridge located immediately above.

In FIGURE 2 can also be seen a restrictor 23 and a de-gassing device 24. The restrictor 23, which has a reduced orifice, has as its object, on the one hand, to raise the pressure of the heavy water surrounding the cartridges 6 so as to prevent its boiling up, and, on the other hand, by this pressurization, to ensure the circulation of the water in the circuit whose function is to detect sheathing ruptures.

The de-gasser 24, located downstream, i.e., above the restrictor 23, has a spirally grooved periphery 25, which, by centrifugal action, separates the bubbles of gas formed by the depressurization of the heavy water as it passes through the diaphragm 23.

A tube 26, passing axially through diaphragm 23 and de-gasser 24, is used for taking test samples of the heavy water to enable detection of the sheathing ruptures; above this there are two orifices such as 27 as outlets for the heavy water, and holes, such as 28 and 29 (FIGURE 3), for the equilibration of the helium pressures inside and outside the cell and the deflector tube 9.

The deflector tube 9 (FIG. 2) prevents the water, as it emerges from the cell through the feed-back orifices 27, from setting up two violent a turbulence on the free surface 10 of the heavy water, which would otherwise affect the reactivity of the reactor. The deflector tube 9 has holes drilled through it, not represented in the figure, these being provided so that the loss of heavy-water pressure downstream of the de-gasser 24 and upstream of the heavy water in the tank proper shall not be too considerable. In fact, the heavy water reaches, in the cell, a level which is so much the higher the greater this loss of pressure, and it is necessary to prevent the water from escaping from the cell through the holes whose function is to equilibrate the helium pressures.

Also to be seen in FIGURE 2 is the end of a thermo-couple element 30 the function of which is to measure the temperature of the heavy water. The point of contact between the elements of this thermo-couple is located as much as possible in the jet of heavy water, in practice one or two centimeters from the top of the de-gasser 24. This thermo-couple 30, of the copper/constantan type for example, is housed in a stainless steel sheath.

In FIGURE 3 can be seen the cased spring 31 the function of which is to press the cell, constituting the subject of the invention, on the base-plate 2 of the tank and to absorb any expansion it may undergo.

Between the cased spring 31 and the top 15 of the cell there is the plug 14, which is wholly inside the tubular block 13 of the reactor when the cell is itself in position. This plug 14 is composed of a sheathing tube 32 made of stainless steel and filled with heavy concrete and lead; the purpose of the latter is to stop the gamma rays emitted as a result of the neutrons being caught up in the concrete.

If reference be made to FIGURE 4 it will be seen that the plub 14 is traversed by two pieces of tubing; the tube 26 for extracting samples of heavy water, and a tube 34 the function of which is to empty the extraction tube 26 prior to the dismantling of the cell. Moreover, the plug 14 also encloses the sheath 33 (FIGURE 3) containing the wires of the thermo-couple 30 (not represented in FIGURE 4). The tubes 26 and 34 terminate, at their upper portions, in a three-way cock 35; the bottom end 36 of the tube 34 opens above the level of the heavy water 10 in the tank.

The cell head 15, according to the invention, has two horizontal flat rims 37 and 38, of which the one serves as a support for the cell on a fixed upper plate member 16 of the tubular block 13 of the reaction and the other for clamping the cell tight.

Finally, the head 15 includes a vertical cylindrical portion 39 for centering the cell in a sleeve 40, the three-way cock 35, and a threaded member 41 for connecting up the extraction tube 26 while the equipment is in operation, and for attaching a head block when the cell is being dismantled.

Each cell is arranged vertically in the tank. The cell is centered by its foot 4 which bears on the base-plate 2 of the tank, and by the cylindrical portion 39 of the cell-head 15 which, when the cell is being placed in position, slides in the sleeve 40 which is itself fixed, by screws, on the tubular block 13. The cell is fixed to this tubular block by a clamp 42.

Gas tightness between the helium atmosphere 11 and the upper chamber 43 of the reactor is ensured by the collapse of a perbunan joint 44 in the head of the cell. Upon the cell's having just been lowered into the reactor and before it has been clamped tight, a gas-tight seal is provided by another joint 45, likewise of perbunan, which slides with the head of the cell in the sleeve 40.

During normal operation, the three-way cock 35 connects the tube 26 for extracting samples of heavy water with a view to the detection of sheathing ruptures, to the outer circuit, not represented.

The two other possible positions of the cock 35, employed when the reactor is being discharged, are as follows:

The tubing 26 for the detection of sheathing ruptures, inside the cell, is connected to the piping 34; the water in the tubing 26 for the detection of sheathing ruptures, empties into the tank by siphon action.

The sheathing-rupture detection tubing, outside the cell (the extension of the tubing 26 is not represented), is connected to the tubing 34; the sheathing-rupture detection tubing empties, whereupon dry helium can be blown through to dry it.

What we claim is:

1. A vertical channel nuclear reactor, comprising: fixed upper and lower plate members; a cell having upper and lower portions, said upper cell portion including a sheathing tube; support means fixedly connected to the sheathing tube of said upper cell portion; clamp means for firmly clamping said support means to said fixed upper plate member to hold said upper cell portion against vertical and lateral movement, said upper cell portion being suspended therebelow; means for mounting cartridges of fissile material within said cell; means mounted at the bottom of said lower cell portion for engaging said lower plate member at a point in vertical alignment with said support means and for preventing lateral movement of said lower cell portion when so engaged; an extendable telescopic coupling connecting said upper and lower cell portions; and resilient means between said upper and lower cell portions to urge said lower cell portion into engagement with said lower plate member.

2. A reactor as defined in claim 1 wherein one portion of said cell comprises an outer casing having a plurality of inwardly directed lugs engaging and gripping corresponding ends of a plurality of aligned cartridges of fissile material, centering means being provided to align the other ends of the respective cartridges.

3. A reactor as defined in claim 2 wherein said centering means comprise cooperating teat-and-recess means interconnecting adjacent ends of succeeding cartridges.

4. A reactor as defined in claim 1 wherein inlet means are provided in said lower cell portion for admitting cooling fluid thereto, and a liquid flow restrictor is mounted above said means for mounting fissile material and adapted to raise the pressure within said cell to prevent the cooling fluid therein from boiling.

5. A reactor as defined in claim 4 including a conduit mounted therein with one open end positioned directly above said restrictor and the other end directed outside of said casing for extracting test samples therefrom.

6. A reactor as defined in claim 4 including a degassing device having spirally grooved flow-directing surfaces is provided above said cartridges to substantially eliminate bubbles formed in the cooling fluid.

7. A reactor as defined in claim 4 wherein a deflector tube is mounted in spaced telescopic relation with respect to said cell, the upper portion of the space between said deflector tube and said casing being in communication with the interior of said cell at a point above the level of said cartridges, whereby a portion of the fluid within said cell may pass to a lower level between said cell and said deflector.

References Cited in the file of this patent

UNITED STATES PATENTS

| | | |
|---|---|---|
| 2,798,848 | Kingdom | July 9, 1957 |
| 2,885,335 | Moore et al. | May 5, 1959 |
| 2,898,280 | Schultz | Aug. 4, 1959 |
| 2,938,848 | Ladd et al. | May 31, 1960 |
| 2,969,311 | Wigner et al. | Jan. 24, 1961 |
| 2,984,609 | Dickson et al. | May 16, 1961 |
| 2,987,458 | Breden et al. | June 6, 1961 |
| 3,043,761 | Reynolds | July 10, 1962 |

FOREIGN PATENTS

| | | |
|---|---|---|
| 784,890 | Great Britain | Oct. 16, 1957 |
| 791,011 | Great Britain | Feb. 19, 1958 |
| 217,980 | Australia | Oct. 27, 1958 |